United States Patent
Abiko et al.

(10) Patent No.: US 9,527,955 B2
(45) Date of Patent: Dec. 27, 2016

(54) METHOD FOR PRODUCING LACTIDE-LACTONE COPOLYMER

(71) Applicant: NATIONAL UNIVERSITY CORPORATION KYOTO INSTITUTE OF TECHNOLOGY, Kyoto (JP)

(72) Inventors: Atsushi Abiko, Kyoto (JP); Yasumi Maruta, Kyoto (JP)

(73) Assignee: NATIONAL UNIVERSITY CORPORATION KYOTO INSTITUTE OF TECHNOLOGY (JP)

( * ) Notice: Subject to any disclaimer, the term of this patent is extended or adjusted under 35 U.S.C. 154(b) by 0 days.

(21) Appl. No.: 14/783,640

(22) PCT Filed: Mar. 19, 2014

(86) PCT No.: PCT/JP2014/057531
§ 371 (c)(1),
(2) Date: Oct. 9, 2015

(87) PCT Pub. No.: WO2014/167966
PCT Pub. Date: Oct. 16, 2014

(65) Prior Publication Data
US 2016/0053049 A1     Feb. 25, 2016

(30) Foreign Application Priority Data

Apr. 12, 2013 (JP) .................................. 2013-084129

(51) Int. Cl.
| | | |
|---|---|---|
| *C08G 63/08* | (2006.01) | |
| *C08G 63/82* | (2006.01) | |
| *C08G 63/664* | (2006.01) | |
| *C08G 18/42* | (2006.01) | |

(52) U.S. Cl.
CPC ............ *C08G 63/823* (2013.01); *C08G 63/08* (2013.01); *C08G 63/664* (2013.01); *C08G 18/428* (2013.01); *C08G 18/4277* (2013.01)

(58) Field of Classification Search
CPC ... C08G 63/08; C08G 63/664; C08G 18/4277; C08G 18/428
See application file for complete search history.

(56) References Cited

U.S. PATENT DOCUMENTS

| | | | |
|---|---|---|---|
| 2005/0171330 A1 | 8/2005 | Hyon et al. | |
| 2009/0171064 A1 | 7/2009 | Arimura et al. | |
| 2010/0305281 A1* | 12/2010 | Fujiwara ............. | C07D 319/06 525/461 |
| 2013/0066042 A1 | 3/2013 | Arimura et al. | |

FOREIGN PATENT DOCUMENTS

| | | | |
|---|---|---|---|
| EP | 2218466 A1 | 8/2010 | |
| JP | 55-149320 A | 11/1980 | |
| JP | 56-49728 A | 5/1981 | |
| JP | 2005-517062 A | 6/2005 | |
| JP | 2005-220333 A | 8/2005 | |
| JP | 2005-306999 A | 11/2005 | |
| JP | 2008-7608 A | 1/2008 | |
| JP | 2009-132769 A | 6/2009 | |
| JP | WO 2010110460 | * | 9/2010 |
| WO | WO 2010/110460 A1 | 9/2010 | |
| WO | WO 03/066705 A1 | 8/2013 | |

OTHER PUBLICATIONS

International Search Report prepared by the Japanese Patent Office on Apr. 3, 2014, for International Application No. PCT/JP2014/057531.
Florczak et al. "Effect of the Configuration of the Active Center on Comonomer Reactivities: The Case of ε-Caprolactone/l,l-Lactide Copolymerization," Angewandte Chemie International Edition, Nov. 2008, vol. 47, No. 47, pp. 9088-9091.
Li et al. "Random Copolymerization of ε-Caprolactone and Lactides Promoted by Pyrrolylpyridylamido Aluminum Complexes," Macromolecules, Nov. 2012, vol. 45, No. 21, pp. 8614-8620.
Nomura et al. "Random Copolymerization of ε-Caprolactone with Lactide Using a Homosalen-Al Complex," Journal of the American Chemical Society, Feb. 2010, vol. 132, No. 6, pp. 1750-1751.
Pappalardo et al. "Living Ring-Opening Homo- and Copolymerization of ε-Caprolactone and L- and D,L-Lactides by Dimethyl(salicylaldiminato)aluminum Compounds," Macromolecules, Aug. 2009, vol. 42, No. 16, pp. 6056-6062.

* cited by examiner

*Primary Examiner* — Gregory Listvoyb
(74) *Attorney, Agent, or Firm* — Sheridan Ross P.C.

(57) ABSTRACT

This invention provides a novel method for producing a lactide-lactone copolymer. The method is characterized by copolymerizing a lactide and a lactone using a molybdenum compound as a catalyst.

11 Claims, 4 Drawing Sheets

METHOD FOR PRODUCING LACTIDE-LACTONE COPOLYMER

CROSS REFERENCE TO RELATED APPLICATIONS

This application is a national stage application under 35 U.S.C. 371 and claims the benefit of PCT Application No. PCT/JP2014/057531 having an international tiling date of Mar. 19, 2014, which designated the United States, which PCT application claimed the benefit of Japanese Patent Application No. 2013-084129, filed on Apr. 12, 2013, the entire contents of each of which are incorporated herein by reference.

TECHNICAL FIELD

The present invention relates to a method for producing a lactide-lactone copolymer.

BACKGROUND ART

Research and development of biodegradable or biocompatible synthetic polymers have been progressing in recent years. It is known that biodegradable or biocompatible synthetic polymers greatly vary in characteristics depending on the type of monomer used to constitute the polymer.

For example, polylactide, i.e., polylactic acid, which is a homopolymer of lactide (LA, a cyclic compound formed by dehydration condensation of two molecules of lactic acid) has characteristics including 1) rapid degradation and absorption in the body, 2) low drug permeability, 3) low biodegradability in soil, and 4) hydrophilicity. In contract, poly($\epsilon$-caprolactone), which is a homopolymer of $\epsilon$-caprolactone (CL), a kind of lactone, has characteristics including 1) slow degradation and absorption in the body, 2) high drug permeability, 3) high biodegradability in soil, and 4) hydrophobicity.

There is a known technique of copolymerizing two or more kinds of monomers under various reaction conditions, thereby producing a copolymer having a combined nature of the homopolymers of these monomers, or a copolymer having an intermediate nature of the homopolymers of these monomers.

It has been known that, in the known copolymerization method of lactide and $\epsilon$-caprolactone, due to the difference in the reaction rate of the respective monomers in the reaction system, polymerization of either lactide or $\epsilon$-caprolactone proceeds first, and then polymerization of the other proceeds, thereby producing a block copolymer in which the polylactic acid moieties and the poly($\epsilon$-caprolactone) moieties are disproportionately present in the copolymer. A recent report disclosed an example of a production method for a lactide-$\epsilon$-caprolactone copolymer in which the distribution of the monomers is controlled in the copolymer (Patent Document 1). This document uses a predetermined aluminum-salen type complex as a catalyst for the copolymer production.

Further, using a carbon compound of molybdenum as a catalyst in the production of a homopolymer of lactone, such as $\epsilon$-caprolactone, has also been reported (Patent Document 2).

CITATION LIST

Patent Documents

Patent Document 1: International Publication WO2010/110460A1
Patent Document 2: JPS56-49728A

SUMMARY OF INVENTION

Technical Problem

In Patent Document 1, a LA-CL copolymer is produced using an aluminum-salen complex (Al-salen) as a catalyst. However, the synthesis of the ligand used as the catalyst needs in many steps, and the preparation is complicated, thereby increasing the cost and time. Further, since an pyrophoric water-prohibiting reagent is used in the preparation of the Al-salen catalyst, the method has problems in safety. Further, since Al-salen catalysts are inferior in storage stability, the Al-salen catalyst must be prepared when used.

Patent Document 2 discloses using a carbon compound of molybdenum as a catalyst for the production of a homopolymer of lactone, such as $\epsilon$-caprolactone. However, Patent Document 2 discloses only lactone, such as $\epsilon$-caprolactone, as the constituent monomer; that is, copolymer production is not assumed.

An object of the present invention is to provide a simple method for producing a lactide-lactone copolymer by which the distribution of the monomers in the copolymer can be controlled.

Another object of the present invention is to provide a safe method for producing the lactide-lactone copolymer.

Solution to Problem

In order to attain the above objects, the present inventors discovered that a lactide-lactone copolymer can be produced by using a predetermined molybdenum compound as a catalyst. With this finding, the inventors completed the present invention.

The present invention is described below more specifically.

Item 1. A method for producing a lactide-lactone copolymer, comprising copolymerizing a lactide and a lactone using a molybdenum compound as a catalyst.

Item 2. The method for producing a lactide-lactone copolymer according to Item 1, wherein the lactone is $\epsilon$-caprolactone.

Item 3. The method for producing a lactide-lactone copolymer according to Item 1 or 2, wherein the molybdenum compound is selected from a molybdenum chelate compound, a salt of polyoxomolybdenum, a molybdenum alkoxide, a salt of molybdenum ion and organic acid, and a molybdenum carbonyl compound.

Item 4. The method for producing a lactide-lactone copolymer according to Item 1 or 2, wherein the molybdenum compound is a hexavalent molybdenum complex.

Item 5. The method for producing a lactide-lactone copolymer according to Item 4, wherein the hexavalent molybdenum complex is a dioxomolybdenum(VI) complex or a polyoxomolybdenum salt.

Item 6. The method for producing a lactide-lactone copolymer according to Item 5, wherein the dioxomolybdenum (VI) complex is selected from a dioxomolybdenum(VI) acetylacetonato complex, a dioxomolybdenum(VI)salen complex, and a dioxomolybdenum(VI)salicylaldehyde complex.

Item 7. The method for producing a lactide-lactone copolymer according to Item 6, wherein the dioxomolybdenum (VI)salen complex is the dioxo-molybdenum(VI)salen complex represented by General Formula (1) below,

[Chem. 1]

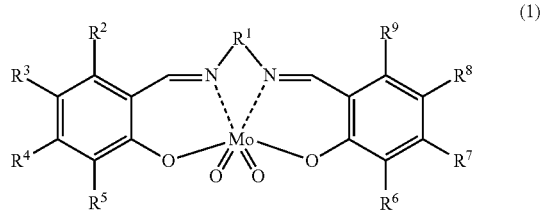

(1)

wherein
$R^1$ is a $C_{2-7}$ bivalent aliphatic hydrocarbon group; and
$R^2$, $R^3$, $R^4$, $R^5$, $R^6$, $R^7$, $R^8$, and $R^9$ independently represent hydrogen, a $C_{1-4}$ alkyl group, a $C_{1-4}$ alkoxy group, a silyl group, an aryl group, a methoxy methyl group, —Cl, —Br, or —I.

Item 8. The method for producing a lactide-lactone copolymer according to Item 7, wherein
the $R^1$ is —(CH$_2$)$_2$—, —(CH$_2$)$_3$—, —CH$_2$CH(CH$_3$)—, —CH$_2$—C(CH$_3$)$_2$—CH$_2$—, —(CH$_2$)$_4$—, 1,2-cyclohexyl group, 1,3-cyclohexyl group, 1,4-cyclohexyl group, 1,2-cyclopentyl group, or 1,2-cycloheptyl group;
$R^2$, $R^4$, $R^7$, and $R^9$ are hydrogen or —CH$_3$;
$R^5$ and $R^6$ are hydrogen, —CH$_3$, —CH$_2$CH$_3$, —C(CH$_3$)$_3$, —OCH$_3$, —Cl, —Br, or —I; and
$R^3$ and $R^8$ are hydrogen, —CH$_3$, —CH$_2$CH$_3$, —C(CH$_3$)$_3$, —OCH$_3$, —Cl, —Br, or —I.

Item 9. The method for producing a lactide-lactone copolymer according to Item 6, wherein the dioxomolybdenum(VI)salicylaldehyde complex is the dioxomolybdenum(VI)salicylaldehyde complex represented by Structural Formula (6) below,

[Chem. 2]

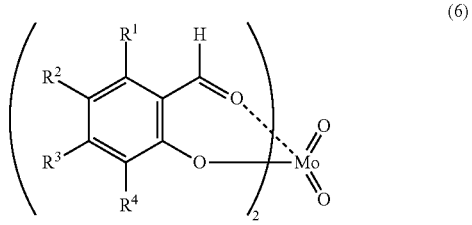

(6)

wherein $R^1$, $R^2$, $R^3$, and $R^4$ are independently selected from hydrogen, —Cl, —Br, —I, —NO$_2$, —OH, —COOH, $C_{1-6}$ linear or branched alkyl group, aryl group that may have, as a ring-constituent, 2 or less heteroatom independently selected from O, N, or S, aryloxy group, alkoxy group, alkane sulfone amide group, and amino group.

Item 10. The method for producing a lactide-lactone copolymer according to claim 9, wherein the $R^1$, $R^2$, $R^3$, and $R^4$ are independently selected from hydrogen, —Cl, —Br, —I, —OCH$_3$, —OCH$_2$CH$_3$, —NO$_2$, —OH, —COOH, —CH$_3$, and —CH$_2$CH$_3$.

Item 11. The method for producing a lactide-lactone copolymer according to Item 5, wherein the polyoxomolybdenum salt is a salt of an anion selected from the group consisting of [Mo$_3$O$_{10}$]$^{2-}$, [Mo$_6$O$_{20}$]$^{4-}$, [Mo$_7$O$_{24}$]$^{6-}$, [Mo$_8$O$_{26}$]$^{4-}$, and [Mo$_{10}$O$_{34}$]$^{8-}$, and a cation selected from the group consisting of ammonium ions, alkyl ammonium ions and alkali metal ions.

Effect of the Invention

In the present invention, the molybdenum compound used as a catalyst may be produced through a simple step or may be obtained from commercial suppliers. Further, since molybdenum is an essential trace metal for a living body, it has low or non-toxicity. Therefore, it is possible to produce a lactide-lactone copolymer in a simple, inexpensive, and/or safe manner. Further, it is also possible to easily control the molecular weight and molecular weight distribution of the lactide-lactone copolymer, as well as the distribution of the monomers in the copolymer.

DESCRIPTION OF EMBODIMENTS

Figure 1:
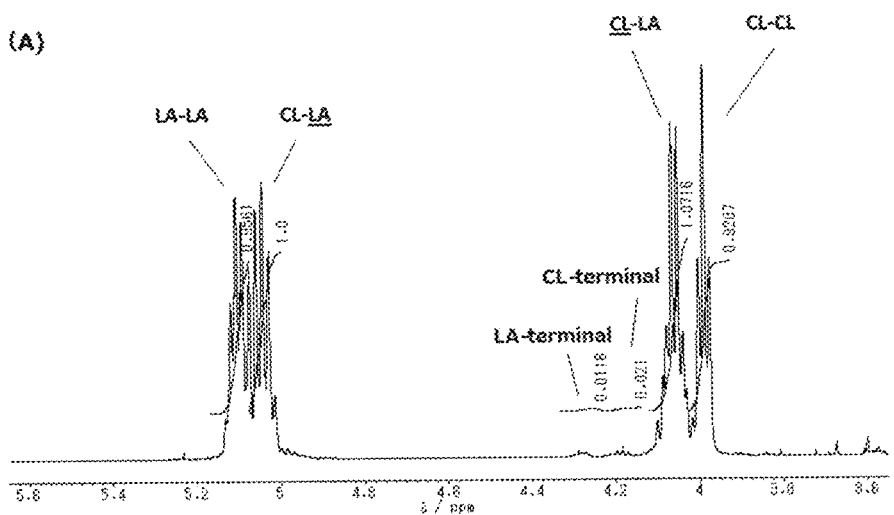
FIG. 1 is a NMR spectrum of a polymer where (a)ϵ-CL/LA ratio is 50/50, (b)ϵ-CL/LA ratio is 25/75, and (c)ϵ-CL/LA ratio is 75/25.
Figure 1:
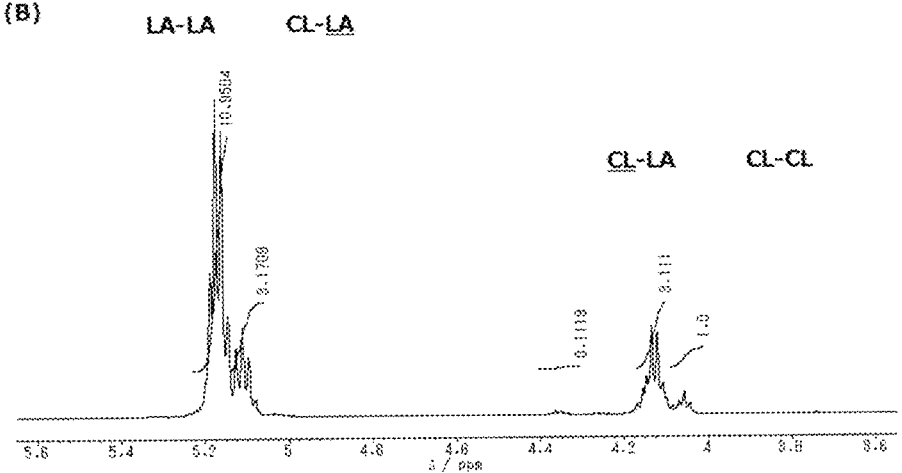
Figure 1:
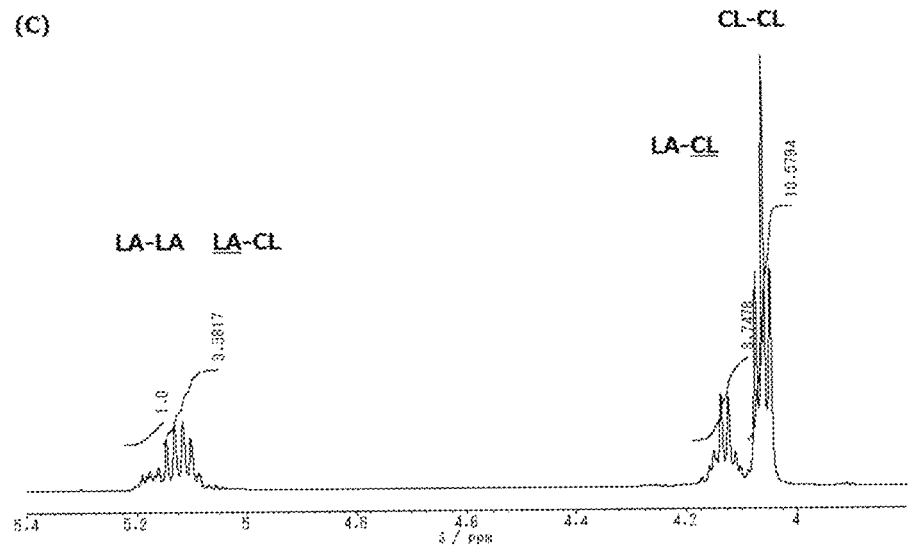
Figure 2:
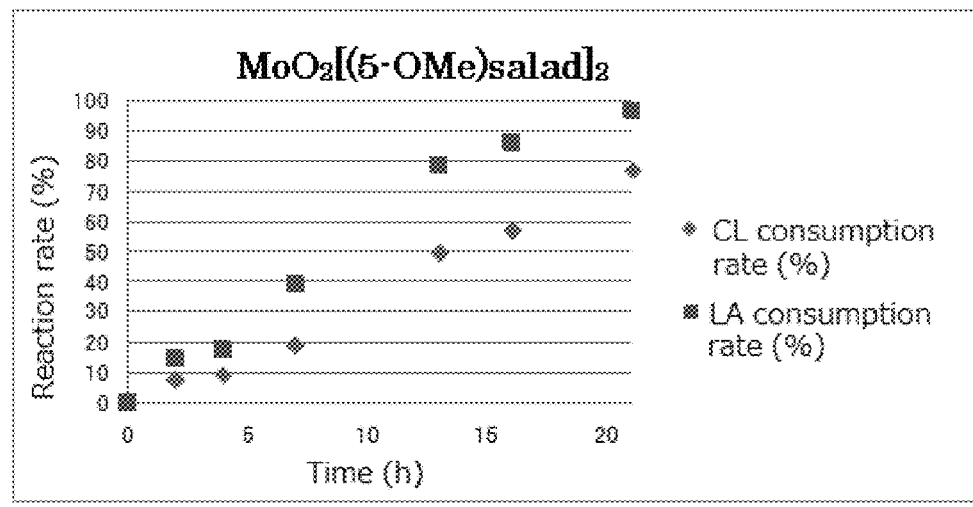
FIG. 2 is a graph showing a reaction rate over time in the synthesis of a ϵ-CL-LA copolymer using MoO$_2$[(5-OMe) salad]$_2$.
Figure 3:
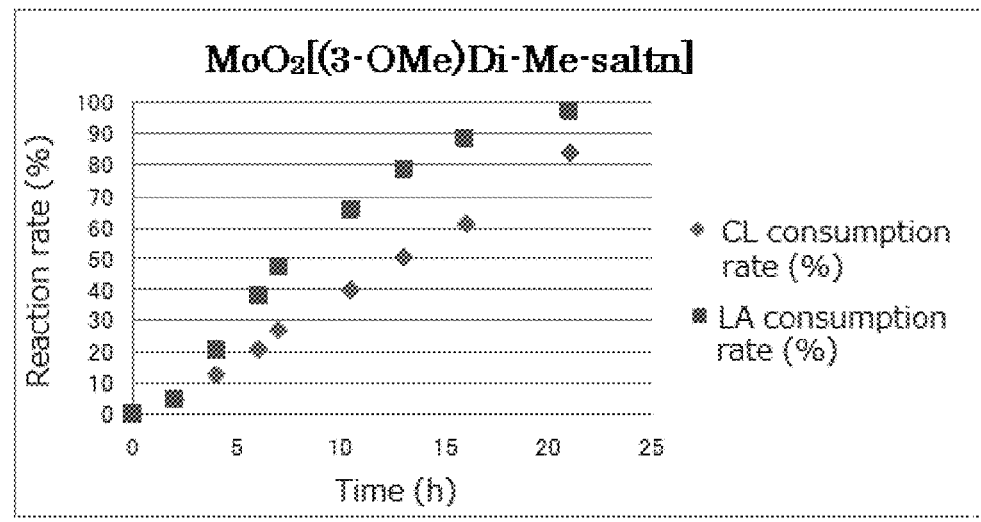
FIG. 3 is a graph showing a reaction rate over time in the synthesis of a ϵ-CL-LA copolymer using MoO$_2$[(3-OMe) Di-Me-saltn](cis-α).
Figure 4:
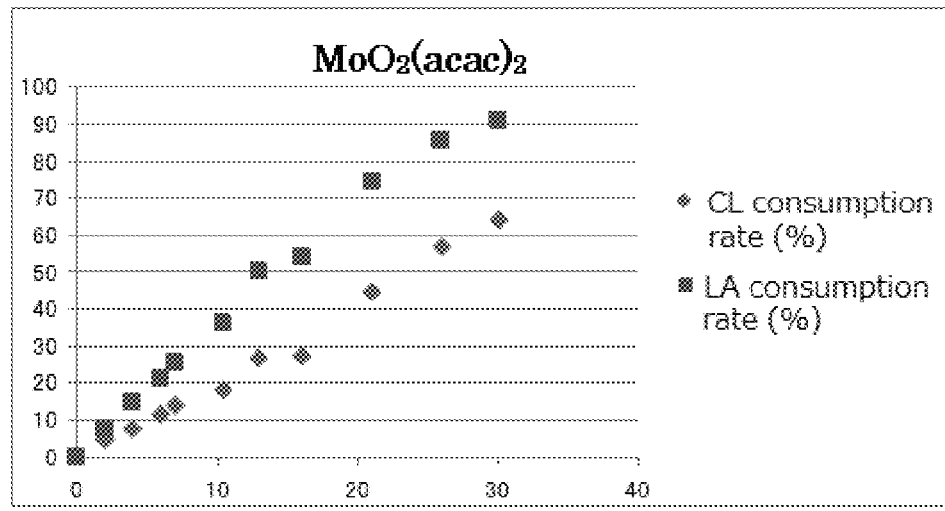
FIG. 4 is a graph showing a reaction rate over time in the synthesis of a ϵ-CL-LA copolymer using MoO$_2$(acac)$_2$.
Figure 5:
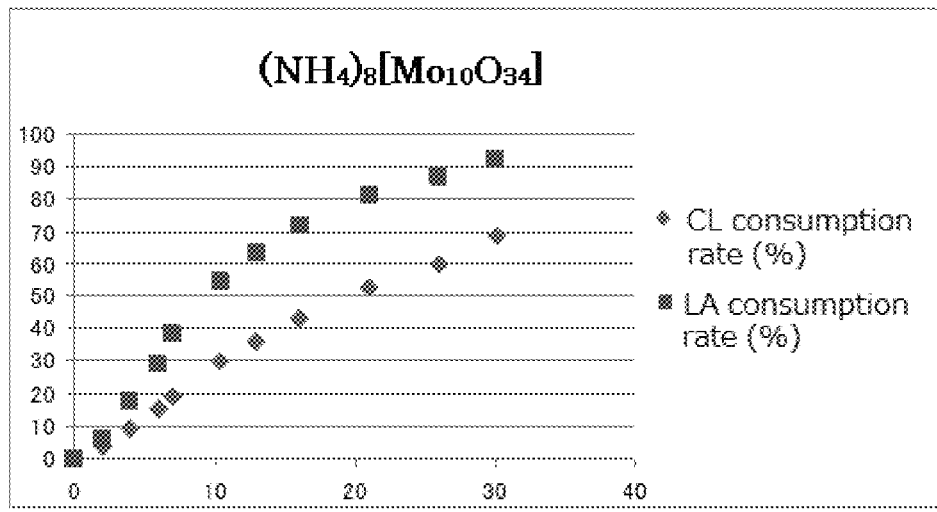
FIG. 5 is a graph showing a reaction rate over time in the synthesis of a ϵ-CL-LA copolymer using (NH$_4$)$_8$[Mo$_{10}$O$_{34}$].

In the present specification, expressions in the singular (a, an, the) refer to both the singular and the plural unless otherwise specified or the context is clearly contradictory.

The present invention provides a method for producing a lactide-lactone copolymer, characterized by copolymerizing a lactide and a lactone using a molybdenum compound as a catalyst.

The lactide and the lactone used as a monomer may be obtained from commercial suppliers or may be synthesized using a known method.

The lactide may be LL-lactide, DD-lactide, or DL-lactide (meso-lactide), or a mixture of one or more of these lactides. In particular, LL-lactide is preferable in terms of cost, practicality and the like.

The lactone is an unsubstituted lactone or a lactone substituted with alkyl or the like. Examples of the lactone include δ-valerolactone(VL), β-ethyl-δ-valerolactone, ϵ-caprolactone (CL), α-methyl-ϵ-caprolactone, β-methyl-ϵ-caprolactone, γ-methyl-ϵ-caprolactone, β,δ-dimethyl-ϵ-caprolactone, 3,3,5-trimethyl-ϵ-caprolactone, enantholactone(7-heptanolide), and dodecanolactone(12-dodecanolide). More preferably, the lactone is δ-valerolactone(VL), ϵ-caprolactone (CL), or a mixture of one or more of these lactones. The lactone is particularly preferably ϵ-caprolactone (CL).

The catalyst used for the method for producing a lactide-lactone copolymer of the present invention is a molybdenum compound.

In one embodiment, the molybdenum compound is selected from (i) molybdenum chelate compound, (ii) a salt of polyoxomolybdenum, (iii) molybdenum alkoxide, (iv) a salt of molybdenum ion and organic acid, and (v) molybdenum carbonyl compound.

The molybdenum chelate compound is a molybdenum metal chelate compound formed of molybdenum and acetylacetone, benzoylacetone, trifluoroacetylacetone, ethyl acetoacetate, salicylaldehyde, acetylacetone imine, salicylaldehyde imine and the like. The molybdenum chelate compound also includes the dioxomolybdenum(VI) complex described later.

The salt of polyoxomolybdenum is a salt formed of polyoxomolybdenum ion (polyacid) as an anion, and the cation. The salt of polyoxomolybdenum is preferably a salt of an anion selected from the group consisting of $[Mo_3O_{10}]^{2-}$, $[Mo_6O_{20}]^{4-}$, $[Mo_7O_{24}]^{6-}$, $[Mo_8O_{26}]^{4-}$, and $[Mo_{10}O_{34}]^{8-}$, and a cation selected from the group consisting of ammonium ions, alkyl ammonium ions and alkali metal ions.

The molybdenum alkoxide is represented by General Formula $Mo(OR)_4$, wherein R represents a residue resulting from removal of OH from an alcohol, such as alkyl groups including methyl, ethyl, propyl, and butyl.

Examples of organic acids of the salts of molybdenum ion and organic acid include carboxylic acid, in particular, naphthenic acid, citric acid, oxalic acid, benzoic acid or the like. The salts obtained are respectively naphthenic acid molybdenum, citric acid molybdenum, oxalic acid molybdenum, benzoic acid molybdenum or the like. The method for producing such salts of molybdenum ion and organic acid is disclosed, for example, in JPH06-219990A.

The molybdenum carbonyl compound is a molybdenum compound having a carbonyl group, such as $Mo(CO)_6$, $(CO)_5Mo(C_5H_5)$, or $(C_5H_5)Mo(CO)_3H$.

In another embodiment, the molybdenum compound is a hexavalent molybdenum complex, preferably a hexavalent molybdenum complex having a ring-opening polymerization activity. The hexavalent molybdenum has been widely used as a catalyst such as a ring-opening metathesis catalyst. The hexavalent molybdenum is also stable and easily obtainable. The hexavalent molybdenum complex is preferably a dioxomolybdenum(VI) complex or a polyoxomolybdenum salt.

Examples of dioxomolybdenum(VI) complex include a dioxomolybdenum(VI)acetylacetonato complex ($MoO_2(acac)_2$) known as a ring-opening polymerization catalyst, and various dioxomolybdenum(VI) complexes obtained by reacting $MoO_2(acac)_2$ with various ligands including bidentate ligands, tridentate ligands, and tetradentate ligands. The $MoO_2(acac)_2$ complex has a bidentate ligand.

A dioxomolybdenum(VI) complex having a bidentate ligand and a synthetic method of the complex are disclosed, for example, in JP2006-50064; A. Sakakura et al., Adv. Synth. Catal. 349, 1641-1646, 2007; A. Sakakura et al., 65, 2102-2109, 2009; and M. Gomez et al., Eur. J. Inorg. Chem., 1071-1076, 2001.

The dioxomolybdenum(VI) complex having a tridentate ligand and a synthetic method of the complex are disclosed, for example, in L. Casella et al., Inorg. Chim. Acta, 14, 89-97, 1988; Y. Li et al., Chem. Commun., 1551-1552, 2000; H. Zhang et al., Inorg. Chem. 45, 1745-1753, 2006; and Fr. Demande, Patent, 43, 2003.

The dioxomolybdenum(VI) complex having a tetradentate ligand and a synthetic method of the complex are disclosed, for example, in K. Yamanouchi et al., Inorg. Chim. Acta, 9, 161-164, 1974; W. E. Hill et al., Inorg. Chim. Acta, 35, 35-41, 1979; Behzad Zeynizadeh et al., Bull. Chem. Soc. Jpn, 78, 307-315, 2005; E. Y. Tshuva et al., Organometallics, 20, 3017-3028, 2001; and Y. Wong, et al., Dalton Trans, 39, 4602-4611, 2010.

In one embodiment, the dioxomolybdenum(VI) complex is a
dioxomolybdenum(VI)acetylacetonato complex ($MoO_2(acac)_2$), a
dioxomolybdenum(VI)salen complex, a
dioxomolybdenum(VI)salicylaldehyde complex, a
dioxomolybdenum(VI)imine complex, or a
dioxomolybdenum(VI)tropolone complex; preferably a
dioxomolybdenum(VI)acetylacetonato complex, a
dioxomolybdenum(VI)salen complex, or a
dioxomolybdenum(VI)salicylaldehyde complex. "Salen" refers to a N,N'-Bis(salicylidene)ethylene-1,2-diamine and a homologue thereof, and a Schiff base ligand, which is a derivative thereof.

The dioxomolybdenum(VI)salen complex is represented by General Formula (1) below.

[Chem. 3]

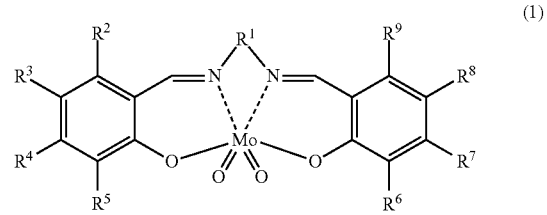

(1)

wherein
$R^1$ represents a $C_{2-7}$ bivalent aliphatic hydrocarbon group; and
$R^2$, $R^3$, $R^4$, $R^5$, $R^6$, $R^7$, $R^8$, and $R^9$ independently represent hydrogen (—H), $C_{1-4}$ alkyl group, $C_{1-4}$ alkoxy group, silyl group, aryl group, methoxy methyl group, —Cl, —Br, or —I.

Examples of $C_{1-4}$ alkyl group include methyl group, ethyl group, propyl group, isopropyl group, n-butyl group, sec-butyl group, isobutyl group, and t-butyl group.

Examples of aryl group include $C_{6-18}$ aryl groups, in particular, phenyl group.

Preferably, $R^1$ is —$(CH_2)_2$—, —$(CH_2)_3$—, —$CH_2CH(CH_3)$—, —$CH_2$—$C(CH_3)_2$—$CH_2$—, —$(CH_2)_4$—, 1,2-cyclohexyl group, 1,3-cyclohexyl group, 1,4-cyclohexyl group, 1,2-cyclopentyl group, or 1,2-cyclo heptyl.

Preferably, $R^2$, $R^3$, $R^4$, $R^7$, $R^8$, and $R^9$ independently represent hydrogen, $C_{1-4}$ alkyl group, —$OCH_3$, —Cl, —Br, or —I.

Preferably, $R^5$ and $R^6$ independently represent hydrogen, $C_{1-4}$ alkyl group, phenyl group, triisopropyl silyl group, triisobutyl silyl group, triphenyl silyl group, —$OCH_3$, —Cl, —Br, or —I.

Preferably, $R^2$ and $R^9$, $R^3$ and $R^8$, $R^4$ and $R^7$, and $R^5$ and $R^6$ are the same, respectively.

In one embodiment, $R^1$ is —$(CH_2)_2$—, —$(CH_2)_3$—, —$CH_2$—$C(CH_3)_2$—$CH_2$—, or —$(CH_2)_4$—; $R^2$, $R^4$, $R^7$, $R^9$ are hydrogen or —$CH_3$, $R^5$ and $R^6$ are hydrogen, —$CH_3$, —$CH_2CH_3$, —$C(CH_3)_3$, —$OCH_3$, —Cl, —Br, or —I; and $R^3$ and $R^8$ are hydrogen, —$CH_3$, —$CH_2CH_3$, —$C(CH_3)_3$, —$OCH_3$, —Cl, —Br, or —I.

Preferably, the dioxomolybdenum(VI)salen complex is represented by Formula (1a) below.

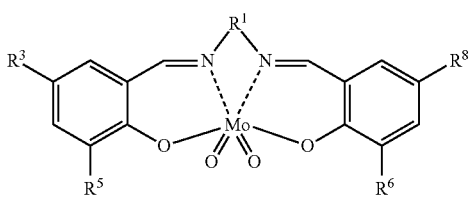

wherein $R^3$ and $R^8$ and $R^5$ and $R^6$ are the same, respectively;

$R^1$ is —$(CH_2)_2$—, —$(CH_2)_3$—, —$CH_2$—$C(CH_3)_2$—$CH_2$—, or —$(CH_2)_4$—;

$R^5$ and $R^6$ are hydrogen, —$CH_3$, —$CH_2CH_3$, —$C(CH_3)_3$, —$OCH_3$, —Cl, —Br, or —I; and $R^3$ and $R^8$ are hydrogen, —$CH_3$, —$CH_2CH_3$, —$C(CH_3)_3$, —$OCH_3$, —Cl, —Br, or —I.

The dioxomolybdenum(VI)salen complex can be synthesized using a known method. For example, the synthesis may be performed by referring to known documents such as, mentioned above, K. Yamanouchi et al., Inorg. Chim. Acta, 9, 161-164, 1974, or W. E. Hill, et al., Inorg. Chim. Acta, 35, 35-41, 1979, as shown in the chemical formula below. Specifically, a ligand (4) is synthesized from a diamine (2) and a salicylaldehyde derivative (3); a constant amount, which is generally, but not limited to, 1 to 4 equivalents of $MoO_2(acac)_2$ is added to the ligand (4); and the mixture is reacted in the appropriate solvent described above at 0° C. to reflux temperature for a predetermined time, generally for one to several hours, thereby obtaining a dioxomolybdenum (VI)salen complex (5). By suitably changing the solvent, cis-α and/or cis-β stereoisomers of dioxomolybdenum(VI) salen complex are generated. cis-α is more preferable in terms of the high ring-opening polymerization activity. The identification of the produced complex is performed by using a known method, such as NMR.

[Chem. 4]

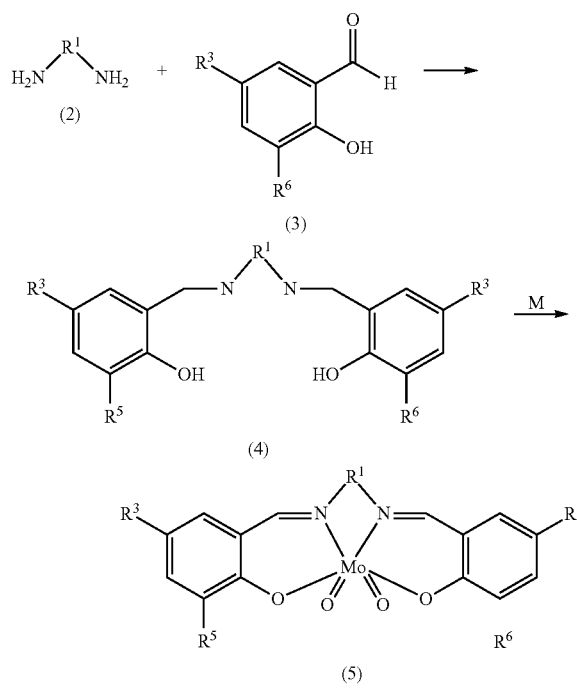

In the dioxomolybdenum(VI)salen complex (5), $R^3$ and $R^8$ and $R^5$ and $R^6$ are the same, respectively, in General Formula (1).

The dioxomolybdenum(VI)salicylaldehyde complex is represented by General Formula (6) below.

[Chem. 5]

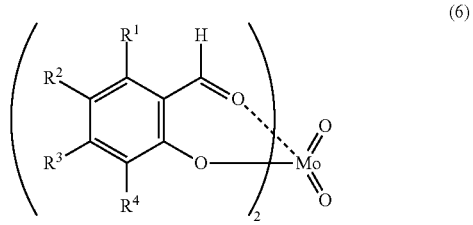

wherein, $R^1$, $R^2$, $R^3$, and $R^4$ independently represent hydrogen, —Cl, —Br, —I, —$NO_2$, —OH, —COOH, $C_{1-6}$ linear or branched alkyl group, aryl group that may have, as a ring-constituent, 2 or less heteroatom independently selected from O, N or S, aryloxy group, alkoxy group, alkane sulfone amide group, or amino group.

Examples of alkyl group include methyl group, ethyl group, propyl group, isopropyl group, n-butyl group, sec-butyl group, isobutyl group, t-butyl group, propyl group, and pentyl. Methyl group, ethyl group, propyl group, or isopropyl group is preferable.

The aryl group is preferably five- to seven-membered ring aryl group, and the aryloxy group is five- to seven-membered ring aryloxy group.

The alkoxy group is preferably a $C_{1-6}$, more preferably a $C_{1-4}$ alkoxy group, and further preferably a methoxy group (—$OCH_3$) or an ethoxy group (—$OCH_2CH_3$).

The alkane sulfone amide group is preferably an alkane sulfone amide group with a $C_{1-6}$ alkyl chain.

In one embodiment, $R^1$, $R^2$, $R^3$, and $R^4$ independently represent hydrogen, —Cl, —Br, —I, —$OCH_3$, —$OCH_2CH_3$, —$NO_2$, —OH, —COOH, —$CH_3$, or —$CH_2CH_3$.

In another embodiment, $R^1$ are hydrogen, —$CH_3$, or —$CH_2CH_3$; $R^2$ are hydrogen, —Cl, —Br, —I, —$OCH_3$, —$OCH_2CH_3$, —$NO_2$, —$CH_3$, or —$CH_2CH_3$; $R^3$ are hydrogen, —$CH_3$, or —$CH_2CH_3$; and $R^4$ are hydrogen, —$OCH_3$, —$OCH_2CH_3$, —$CH_3$, or —$CH_2CH_3$.

The dioxomolybdenum(VI)salicylaldehyde complex is synthesized as a reaction intermediate of many complexes such as imine complexes (K. Yamanouchi et al., Inorg. Chim. Acta, 9, 83-86, 1974), and can be obtained by filtration of precipitates generated by neutralizing an ammonium molybdate (7) and a salicylaldehyde derivative (8) with hydrochloric acid in Methanol-$H_2O$, as shown in the reaction formula below (product (6)). The identification of the produced complex is performed using a known method, such as CHN elemental analysis.

[Chem. 6]

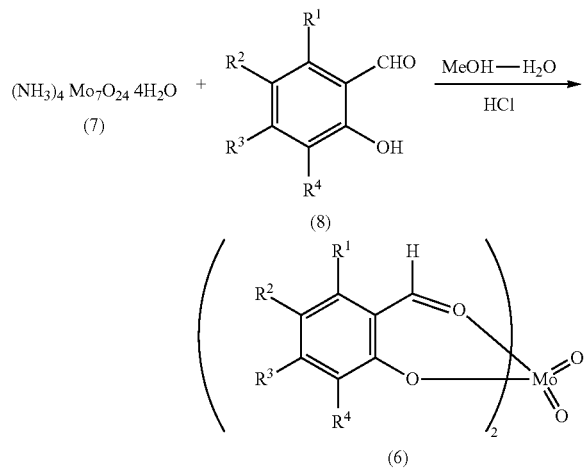

Synthesis of Salicylaldehyde Complex

The dioxomolybdenum(VI)imine complex is synthesized by adding amine to an ethanol solution containing a $MoO_2$ [(3-OMe)salad]$_2$ complex, and subjecting the mixture to 30-minute reflux. For example, see K. Yamanouchi, et al., Inorg. Chim. Acta, 1974, 9, 83-86. The dioxomolybdenum (VI)tropolone complex is synthesized by adding a tropolone-ethanol solution to an ammonium molybdate aqueous solution, adding sulfuric acid to make an acidic system, and stirring the mixture for 30 minutes. For example, see W. P. Griffith, et al., Polyhedron, 6(5), 891, 1987.

The salt of polyoxomolybdenum (polyoxomolybdenum salt) is preferably a salt of an anion selected from the group consisting of $[Mo_3O_{10}]^{2-}$, $[Mo_7O_{20}]^{4+}$, $[Mo_7O_{24}]^{6-}$, $[Mo_8O_{26}]^{4-}$, and $[Mo_{10}O_{34}]^{8-}$, and a cation selected from the group consisting of ammonium ions, alkyl ammonium ions and alkali metal ions. Either of the salts is known, and can be produced by using a known method. More preferably, the polyoxomolybdenum salt is a salt of the anion and an ammonium ion mentioned above. Particularly preferably, the polyoxomolybdenum salt is $(NH_4)_8[Mo_{10}O_{34}]$. $(NH_4)_8[Mo_{10}O_{34}]$ can be obtained by thermal decomposition of ammonium molybdate $(NH_4)_6Mo_7O_{24}\cdot 4H_2O$ at 150° C. for 3 hours under reduced pressure. For example, see J. E. Baez et al., Polymer, 46, 12118-12129, 2005.

In the copolymerization of lactide and lactone using the molybdenum compound as a catalyst, an initiator may be added. Although it is possible to cause the copolymerization without using an initiator since the moisture in the atmosphere serves as an initiator, the polymerization degree and the reaction can be controlled by adding an initiator. Examples of the initiator include metal alkoxide (see, for example, JP2001-2763) and alcohol. Examples of alcohol include, in particular, aliphatic alcohol including high-boiling higher alcohol having 6 or more carbon atoms, such as lauryl alcohol; alicyclic alcohol, such as cyclododecanol; and aromatic alcohol such as benzyl alcohol, and polyhydric alcohol.

The manner of polymerization in the copolymerization of lactide and lactone using the molybdenum compound as a catalyst is not particularly limited. Examples include solution polymerization, slurry polymerization, and bulk polymerization. Examples of organic solvent used for the above polymerization include aromatic hydrocarbons such as toluene, benzene, or xylene, chlorine-based hydrocarbons such as chloroform or trichloroethylene, and THF.

The amount of the catalyst used for the polymerization varies depending on the type of solvent, the condition of polymerization reaction, and the like; however, the amount of the catalyst is generally in a range of 0.0005 to 1.0 mol % based on the monomer as the raw material. Generally, polymers can be obtained with a catalyst in an amount of about 0.001 to 0.1 mol %.

The temperature in the method for producing the copolymer of the present invention is suitably set depending on the type or the amount of the catalyst and the monomer to be used, as well as the molecular weight of the polymer to be produced; however, generally, the reaction temperature is preferably 50° C. to 200° C.

The reaction time in the method for producing the copolymer of the present invention is also suitably set depending on the type or the amount of the catalyst and the monomer to be used, as well as the molecular weight of the polymer to be produced; however, generally, the reaction time is several minutes to several days, preferably 5 minutes to 3 days. In view of practicality, the reaction is preferably completed within 2 days (48 hours).

The copolymer obtained by using the production method of the present invention includes any kind of copolymers; however, in particular, random copolymers can be advantageously obtained. In the present specification, the meaning of "random copolymer" is different from alternating copolymer, periodic copolymer, block copolymer, or graft copolymer. "Random copolymer" means a copolymer in which the monomers are randomly aligned according to the mixing composition (molar ratio).

For example, by copolymerizing a lactide and a lactone at a ratio of 1:1, a copolymer comes close to an ideal random copolymer. In other words, a lactide-lactone copolymer in which both the mean sequence length (also called "mean chain length") of the lactide and the mean sequence length of the lactone are nearly 2, and the lactide and the lactone are substantially evenly distributed in the polymer molecule, may be advantageously obtained. In the present specification, the expression "the lactide and the lactone are substantially evenly distributed in the polymer molecule" means that the mean sequence length of the lactide and the mean sequence length of the lactone in the lactide-lactone copolymer are both 1.0 to 3.5. The mean sequence lengths of the lactone and the lactide are preferably 1.5 to 3.0, more preferably 1.7 to 2.5. In the lactide-lactone copolymer, the sequence of the monomers, and the molecular weight and molecular weight distribution of the copolymer are advantageously controlled. The random copolymer is not necessarily a copolymer strictly according to Bernoulli statistics.

[0083]

Here, assuming that ε-caprolactone is used as the lactone, the mean sequence length $L_{LA}$ of the lactide and the mean sequence length $L_{CL}$ of the ε-caprolactone can be calculated according to Formulas (A) and (B) below, respectively, as disclosed in the following document: J. Kasperczyk et al., Coordination polymerization of lactides, 4. The role of transesterification in the copolymerization of L,L-lactide and ε-caprolactone, Die Makromolekulare Chemie Volume 194, Issue 3, pp. 913-925, March 1993.

[Math. 1]

$$L_{LA} = \frac{[LL\text{-}LL\text{-}LL] + [LL\text{-}LL\text{-}C] + [C\text{-}LL\text{-}LL] + [C\text{-}LL\text{-}C]}{[C\text{-}LL\text{-}C] + \frac{[LL\text{-}LL\text{-}C] + [C\text{-}LL\text{-}LL]}{2}} \quad (A)$$

[Math. 2]

$$L_{CL} = \frac{[LL\text{-}C\text{-}LL] + [LL\text{-}C\text{-}C] + [C\text{-}C\text{-}LL] + [C\text{-}C\text{-}C]}{[LL\text{-}C\text{-}LL] + \frac{[LL\text{-}C\text{-}C] + [C\text{-}C\text{-}LL]}{2}} \quad (B)$$

wherein C represents a ε-caprolactone unit in the copolymer, and LL represents a lactide unit in the copolymer, the square brackets denote the integral intensity of $^{13}$C NMR peak of each triad.

The method for producing the lactide-lactone copolymer of the present invention makes it possible to easily control the molecular weight and molecular weight distribution of the copolymer to be obtained, as well as the distribution of the monomers in the copolymer to be obtained. The obtained lactide-lactone copolymer may be used for biomedical materials. The mean molecular weight of the lactide-lactone copolymer may be controlled by adjusting the amount of the initiator; the mean molecular weight is generally several thousands to several hundred thousands.

Further, in carrying out the production method of the present invention, the mixing molar ratio of the lactide to the lactone may be suitably selected. The mixing molar ratio of the lactide to the lactone is generally 1:99 to 99:1, more preferably 10:90 to 90:10, for example, 25:75 to 75:25. It is possible to advantageously obtain a copolymer according to the molar ratio of lactide and lactone. Thus the molar ratio of the lactide to lactone in the obtained copolymer is also generally 1:99 to 99:1, more preferably 10:90 to 90:10, for example, 25:75 to 75:25. For example, by increasing the amount of lactide (decreasing the amount of lactone), it is possible to obtain a lactide-lactone copolymer with a dominant polylactide nature and a partial polylactone nature, as a random copolymer according to the molar ratio of lactide and lactone. In contrast, by increasing the amount of lactone (decreasing the amount of lactide), it is possible to obtain a lactide-lactone copolymer with a dominant polylactone nature and a partial polylactide nature, as a random copolymer according to the molar ratio of lactide and lactone. Therefore, by changing the molar ratio between lactide and lactone, it is possible to advantageously obtain a copolymer with desired characteristics.

The characteristics of the resulting polymer are evaluated by using the following measurement method. The reaction rate of the lactide and the reaction rate of the lactone are calculated from the ratio of the residual amounts of lactide and lactone to the production amounts of lactide and lactone (monomer conversion amount); the ratio is determined by $^1$H-NMR measurement of a sampled portion of the polymerization solution. Further, the ratio of lactide content to lactone content in the copolymer is calculated from the results of $^1$H-NMR measurement of a copolymer contained in a sampled portion of the polymerization solution. The number average molecular weight (Mn) and the molecular weight distribution (Mw/Mn) are calculated from the results of chromatography, for example, gel permeation chromatography or size exclusion chromatography, of a copolymer contained in a sampled portion of the polymerization solution. The mean chain length of the lactide and the mean chain length of the lactone are calculated according to Formulas (A) and (B), respectively, based on the method mentioned above and disclosed in Die Makromolekulare Chemie, Volume 194, Issue 3, pp. 913-925, March 1993, using the results of $^{13}$C-NMR measurement with respect to a copolymer contained in a sampled portion of the polymerization solution.

The disclosures of all patent applications and documents referred to in this specification are incorporated herein by reference.

The present invention is more specifically explained below in reference to Examples, but is not limited to those examples.

EXAMPLES

Measurement Method

In the Examples below, NMR, GPC, and DSC were performed in the following conditions unless otherwise specified.

NMR

NMR was performed using a Bruker DRX500 spectrometer (Bruker Corporation). CDCl$_3$ and DMSO-d$_6$ containing 0.03 vol % of TMS as the standard substance was used as the solvent.

Figure 6:
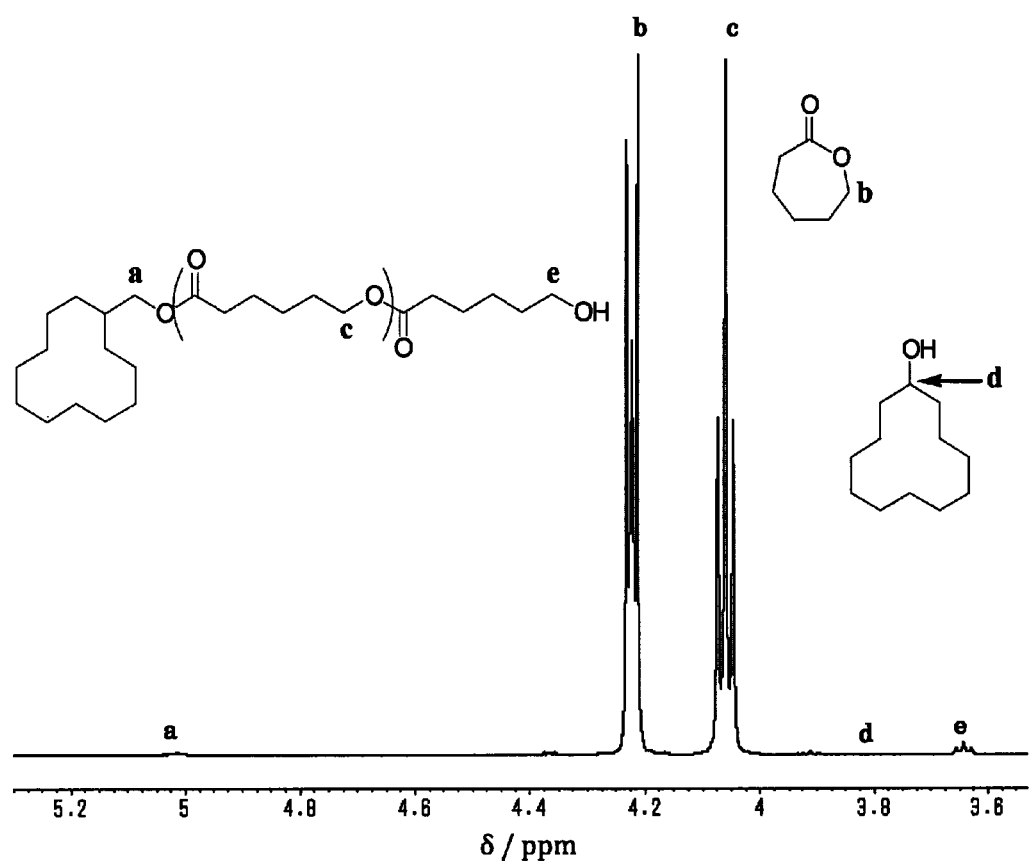
FIG. 6 shows the NMR spectroscopy results for the produced polymer of this specification.

Based on the NMR of the produced polymer (FIG. 6), the reaction rate, the initiator consumption rate, and the polymerization degree were determined as follows (Table 1).

(ε-CL reaction rate)=(c+e)/(b+c+e)
(Initiator consumption rate)=a/(a+d)
(Polymerization degree)=(c+e)/e Gel Permeation Chromatography (GPC)

GPC was performed using a pump (LC-10ADVP, Shimadzu Corporation), an RI detector (RID-10A, Shimadzu Corporation), and a Shodex GPC KF-804L column (Showa Denko K.K.) at an oven temperature of 40° C. and a THF flow rate of 0.5 ml/min. A sample was made using 0.5 ml of THF with respect to 1.8 mg of polymer, and the measurement was performed by pouring 10 μl of the sample in the column). The molecular weights Mn and Mw, and the molecular weight ratio Mw/Mn were calculated by making an analytical curve using polystyrene as the standard substance.

Differential Scanning Calorimeter (DSC)

DSC was performed by measuring a glass transition temperature (Tg) using a DSC 2920 (TA Instruments) at a temperature in a range of −80° C. to 200° C. with a heating rate of 10° C./min. A general measurement was first performed; then, after the sample was allowed to cool, the measurement was performed again to obtain data.

In the Examples below, all reagents (chemicals) were obtained from Tokyo Chemical Industry Co., Ltd., or Wako Pure Chemical Industries, Ltd.

Example 1

Production of Dioxomolybdenum Salen Complex

The ligand (4) was synthesized from a diamine (2) and a salicylaldehyde derivative (3) by referring to K. Yamanouchi et al., Inorg. Chim. Acta, 9, 161-164, 1974, or W. E. Hill et al., Inorg. Chim. Acta, 35, 35-41, 1979, or the like, as shown in the reaction formula of Table 2 below.

More specifically, a diamine (2) was added to an ethanol solution containing a corresponding salicylaldehyde derivative (3) in a manner such that the amount of the salicylaldehyde derivative is 2 equivalents based on the diamine. The mixture was reacted for 2 to 5 hours under heat and reflux. After the reaction, the mixture was ice-cooled, and the generated precipitates were collected by filtration, washed with ethanol several times, and dried to give a corresponding ligand (4) in Table 2. In Table 2, the abbreviation "Salen" represents $R^1$=—$CH_2CH_2$—, the abbreviation "Saltn" represents $R^1$=—$CH_2CH_2CH_2$—, the abbreviation "Di-Me-saltn" represents $R^1$=—$CH_2C(CH_3)_2CH_2$—, and the abbreviation "Saltet" represents $R^1$=—$(CH_2)_4$—.

Subsequently, an acetone solution containing 3 equivalents of $MoO_2(acac)_2$ was added to an acetone solution containing the obtained ligand under ice cooling, and the mixture was reacted at 0° C. for an hour. Filtration, washing with acetone, and drying were performed with the resulting mixture to give a dioxomolybdenum(VI)salen complex that mainly contains cis-α product shown in Table 3 (Table 3). The production of dioxomolybdenum(VI)salen complex was confirmed by performing $^1$H-NMR (500 MHz, DMSO-d6). In the table, Me represents a methyl group (—$CH_3$).

TABLE 2

Synthesis of ligand

| 2 | $R^1$ | 3 | $R^2$ | $R^3$ | 4 | Abbreviation | Yield (%) | Mp (° C.) |
|---|---|---|---|---|---|---|---|---|
| 2a | —$(CH_2)_2$— | 3a | H | H | 4aa | Salen | —*1 | —*1 |
|  |  | 3b | Me | H | 4ab | (3-Me)salen | 88.5 | 114.0 |
|  |  | 3c | OMe | H | 4ac | (3-OMe)salen | 92.9 | 162.0 |
|  |  | 3d | H | Me | 4ad | (5-Me)salen | 89.6 | 166.0 |
|  |  | 3e | H | OMe | 4ae | (5-OMe)salen | 93.7 | 163.5 |
|  |  | 3f | H | Br | 4af | (5-Br)salen | 94.7 | 184.5 |
| 2b | —$(CH_2)_3$— | 3a | H | H | 4ba | Saltn | 50.0 | 43.0 |
|  |  | 3b | Me | H | 4bb | (3-Me)saltn | 55.0 | 66.0 |
|  |  | 3c | OMe | H | 4bc | (3-OMe)saltn | —*2 | — |
|  |  | 3d | H | Me | 4bd | (5-Me)saltn | 44.2 | 60.0 |
|  |  | 3e | H | OMe | 4be | (5-OMe)saltn | 84.1 | 101.0 |
|  |  | 3f | H | Br | 4bf | (5-Br)saltn | 94.3 | 126.0 |
| 2c | —$CH_2C(CH_3)_2CH_2$— | 3a | H | H | 4ca | Di-Me-saltn | 78.3 | 97.5 |
|  |  | 3b | Me | H | 4cb | (3-Me)Di-Me-saltn | —*2 | — |
|  |  | 3c | OMe | H | 4cc | (3-OMe)Di-Me-saltn | —*2 | — |
|  |  | 3d | H | Me | 4cd | (5-Me)Di-Me-saltn | 64.3 | 101.0 |
|  |  | 3e | H | OMe | 4ce | (5-OMe)Di-Me-saltn | —*2 | — |
|  |  | 3f | H | Br | 4cf | (5-Br)Di-Me-saltn | 89.4 | 129.5 |
| 2d | —$(CH_2)_4$— | 3a | H | H | 4da | Saltet | 85.5 | 88.5 |
|  |  | 3b | Me | H | 4db | (3-Me)saltet | 89.7 | 106.5 |
|  |  | 3c | OMe | H | 4dc | (3-OMe)saltet | 94.8 | 146.5 |
|  |  | 3d | H | Me | 4dd | (5-Me)saltet | 94.8 | 122-124 |
|  |  | 3e | H | OMe | 4de | (5-OMe)saltet | 91.3 | 119-121 |
|  |  | 3f | H | Br | 4df | (5-Br)saltet | 93.4 | 149.0 |

*1Not synthesized but obtained from commercial supplies.
*2The synthesis was successful but precipitates were not generated.

TABLE 3

Synthesis of dioxomolybdenum(VI)salen complex (cis-α)

| Dioxomolybdenum(VI)salen complex (5) | Ligand (4) | Yield (%) | cis-α (%) | cis-β (%) | Ligand (%) | $^1$H NMRδ*3 |
|---|---|---|---|---|---|---|
| $MoO_2$ Salen | 4aa | 77.5 | 89.0 | 0 | 11.0 | 8.47 |
| $MoO_2$ (3-OMe)salen | 4ac | 62.0 | 79.8 | 2.0 | 18.2 | 8.46 |
| $MoO_2$ (5-Me)salen | 4ad | 63.5 | 86.5 | 0 | 13.5 | 8.40 |
| $MoO_2$ (5-OMe)salen | 4ae | 77.1 | 80.5 | 5.6 | 13.9 | 8.45 |
| $MoO_2$ (5-Br)salen | 4af | 99.6 | 85.3 | 0 | 14.7 | 8.45 |
| $MoO_2$ Saltn | 4ba | 86.9 | 86.2 | 0.8 | 13.0 | 8.58 |
| $MoO_2$ (3-Me)saltn | 4bb | 52.4 | 65.7 | 4.4 | 29.9 | 8.54 |
| $MoO_2$ (3-OMe)saltn | 4bc | 81.8 | —*1 | 0 | —*1 | 8.56 |
| $MoO_2$ (5-Me)saltn | 4bd | 64.4 | 88.3 | 0 | 11.7 | 8.50 |
| $MoO_2$ (5-OMe)saltn | 4be | 56.3 | 89.7 | 2.0 | 8.3 | 8.55 |
| $MoO_2$ (5-Br)saltn | 4bf | 85.6 | 84.0 | 2.0 | 14.0 | 8.55 |
| $MoO_2$ Di-Me-saltn | 4ca | 94.6 | 41.6 | 5.5 | 52.9 | 8.47 |

TABLE 3-continued

Synthesis of dioxomolybdenum(VI)salen complex (cis-α)

| Dioxomolybdenum(VI)salen complex (5) | Ligand (4) | Yield (%) | cis-α (%) | cis-β (%) | Ligand (%) | $^1$H NMRδ*³ |
|---|---|---|---|---|---|---|
| MoO$_2$ (3-OMe)Di-Me-saltn | 4cc | 63.8 | 63.8 | 0 | 36.2 | 8.45 |
| MoO$_2$ (5-Me)Di-Me-saltn | 4cd | 45.9 | 59.7 | 20.4 | 19.8 | 8.40 |
| MoO$_2$ (5-OMe)Di-Me-saltn | 4ce | 37.4 | 63.0 | 14.4 | 22.6 | 8.44 |
| MoO$_2$ (5-Br)Di-Me-saltn | 4cf | 29.1 | 52.5 | 26.1 | 21.4 | 8.46 |
| MoO$_2$ Saltet | 4da | 98.7 | 58.9 | 4.7 | 36.4 | 8.43 |
| MoO$_2$ (3-Me)saltet | 4db | 58.2 | —*² | —*² | —*² | |
| MoO$_2$ (3-OMe)saltet | 4dc | 74.5 | 79.3 | 0 | 20.7 | 8.41 |
| MoO$_2$ (5-Me)saltet | 4dd | 71.8 | 61.2 | 18.4 | 20.4% | 8.36 |
| MoO$_2$ (5-OMe)saltet | 3de | 93.5 | —*² | —*² | —*² | |
| MoO$_2$ (5-Br)saltet | 3df | 80.5 | 73.5 | 2.5 | 23.7 | 8.42 |

*¹Calculation was impossible because the chemical shifts of the ligand peak and the complex peak overlapped.
*²Unrecognizable because of many unidentified peaks.
*³Chemical shift of hydrogen bonded to imine carbon.

Example 2

Measurement of Ring-Opening Polymerization Activity of Dioxomolybdenum Salen Complex Using the cis-α stereoisomers of MoO$_2$(3-OMe)salen, MoO$_2$(3-OMe)saltn, MoO$_2$(3-OMe)Di-Me-saltn, and MoO$_2$(3-OMe)saltet among the dioxomolybdenum salen complexes obtained in Example 1, the ring-opening polymerization activity of ε-caprolactone (CL) was examined with 1-hour reaction using benzyl alcohol as an initiator under a toluene reflux in the following conditions: ε-caprolactone:initiator:catalyst=100:10:1(molar ratio) (ε-caprolactone=110 μl, benzyl alcohol=10 μl, catalyst=0.1 mmol, and toluene=1 mL). As shown in Table 4, all complexes had a high catalyst activity. The reaction rate and the polymerization degree were measured by NMR using CDCl$_3$ as a solvent.

Further, a reaction was performed in mesitylene at 110° C. for 20 minutes with a smaller amount of catalyst using cyclododecanol as an initiator under the following condition: ε-caprolactone:initiator:catalyst=100:1:0.05 (molar ratio). As shown in Table 5, the results revealed that MoO$_2$(3-OMe)Di-Me-saltn had the highest activity.

TABLE 4

CL reaction rate of each catalyst (%), initiator reaction rate (%) and polymerization degree

| No. | Catalyst | CL reaction rate (%) | Initiator reaction rate (%) | Polymerization degree |
|---|---|---|---|---|
| 1 | MoO$_2$(3-OMe)salen | 79 | 100 | 8.9 |
| 2 | MoO$_2$(3-OMe)saltn | 100 | 91 | 13.0 |
| 3 | MoO$_2$(3-OMe)Di-Me-saltn | 100 | 91 | 14.0 |
| 4 | MoO$_2$(3-OMe)saltet | 99 | 100 | 11.5 |

TABLE 5

CL reaction rate of each catalyst (%)

| No. | Catalyst | CL reaction rate (%) |
|---|---|---|
| 1 | MoO$_2$(3-OMe)salen | 8 |
| 2 | MoO$_2$(3-OMe)saltn | 20 |
| 3 | MoO$_2$(3-OMe)Di-Me-saltn | 100 |
| 4 | MoO$_2$(3-OMe)saltet | 75 |

Example 3

Comparison of Catalyst Activity of MoO$_2$(X)Di-Me-Saltn

A reaction was performed in mesitylene at 110° C. for 15 minutes using cyclododecanol as an initiator under the following condition: ε-caprolactone:initiator:catalyst=100:1:0.05 (molar ratio). As shown in Table 6, the results revealed that MoO$_2$(3-OMe)Di-Me-saltn had the highest activity.

The reaction rate and the polymerization degree were measured by NMR using CDCl$_3$ as a solvent.

TABLE 6

CL reaction rate of each catalyst (%)

| No. | Catalyst | CL reaction rate (%) |
|---|---|---|
| 1 | MoO$_2$(3-OMe)Di-Me-saltn | 100 |
| 2 | MoO$_2$(5-Me)Di-Me-saltn | 72 |
| 3 | MoO$_2$(5-OMe)Di-Me-saltn | 31 |
| 4 | MoO$_2$(5-Br)Di-Me-saltn | 10 |

Example 4

Dioxomolybdenum Salicylaldehyde Complex

According to the synthesis method disclosed in K. Yamanouchi, S. Yamada, Inorg. Chim. Acta, 9, 83-86, 1974, a salicylaldehyde derivative and ammonium molybdate were dissolved in methanol-H$_2$O, and 1 ml of 12M HCl was gradually added. Thereafter, the mixture was reacted for 4 hours at room temperature, and the generated precipitates were collected by filtration, thereby synthesizing various dioxomolybdenum salicylaldehyde complexes (the reaction formula shown in Chem. 7, Table 7). The methods for synthesizing the complexes are described below. Further, the identification was performed by elemental analysis.

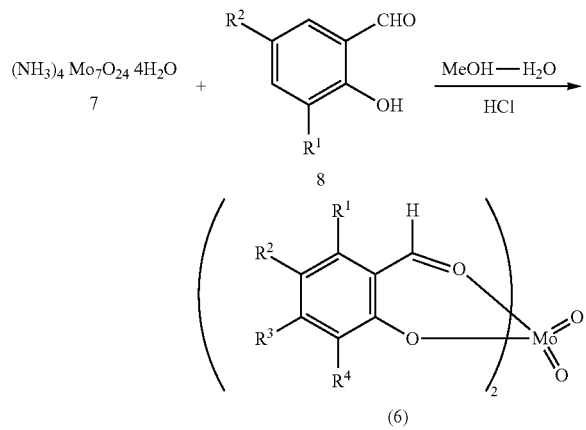

Table Showing Synthesis of Salicylaldehyde Complex

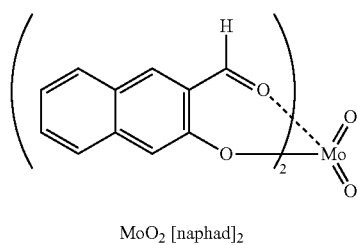

MoO$_2$[naphad]$_2$ 4-1: Synthesis of MoO$_2$(salad)$_2$ 15 ml of an aqueous solution containing 1.2392 g (1.003 mmol; salicylaldehyde: Mo=2.5:1) of ammonium heptamolybdate ((NH$_4$)$_6$Mo$_7$O$_{24}$/4H$_2$O) was added to 5 ml of a methanol solution containing 2.2009 g (18.02 mmol) of salicylaldehyde, and 1 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 2.4210 g (6.540 mmol) of a yellow crystal (yield: 93.2%).

mp=250-267° C. (degradation), Anal. Calcd for C$_{14}$H$_{10}$O$_6$Mo: C, 45.4; H, 2.72. Found: C, 45.7; H, 2.80.

4-2: Synthesis of MoO$_2$[(3-OMe)salad]$_2$ 15 ml of an aqueous solution containing 1.2347 g (0.999 mmol) of ammonium heptamolybdate ((NH$_4$)$_6$Mo$_7$O$_{24}$/4H$_2$O) was added to 5 ml of a methanol solution containing 2.7393 g (18.00 mmol) of o-vanillin, and 1 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 2.8222 g (6.560 mmol) of a yellow crystal (yield: 93.8%).

mp=160-227° C. (degradation), Anal. Calcd for C$_{16}$H$_{14}$O$_8$Mo: C, 44.7; H, 3.3. Found: C, 45; H, 3.3.

4-3: Synthesis of MoO$_2$[(3-Me)salad]$_2$ 7.5 mL of an aqueous solution containing 0.6181 g (0.5000 mmol) of ammonium heptamolybdate ((NH$_4$)$_6$Mo$_7$O$_{24}$/4H$_2$O) was added to 2.5 ml of a methanol solution containing 1.2280 g (9.019 mmol) of 3-methylsalicylaldehyde, and 0.5 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 1.2824 g (3.220 mmol) of a yellow crystal (yield: 92.0%).

mp=265-285° C. (degradation), Anal. Calcd for C$_{16}$H$_{14}$O$_6$Mo: C, 48.3; H, 3.54. Found: C, 49.2; H, 4.0.

TABLE 7

| No. 8 | R$^1$ | R$^2$ | 6 | Name | Yield (%) | mp (°C.) (decomposition point) |
|---|---|---|---|---|---|---|
| 1 | 8a | H | H | 6a | MoO$_2$[salad]$_2$ | 93.2 | 250-267 |
| 2 | 8b | OCH$_3$ | H | 6b | MoO$_2$[(3-OMe)salad]$_2$ | 93.8 | 160-227 |
| 3 | 8c | CH$_3$ | H | 6c | MoO$_2$[(3-Me)salad]$_2$ | 92.0 | 265-285 |
| 4 | 8d | H | OCH$_3$ | 6d | MoO$_2$[(5-OMe)salad]$_2$ | 79.9 | 160-240 |
| 5 | 8e | H | CH$_3$ | 6e | MoO$_2$[(5-Me)salad]$_2$ | 58.5 | 180-250 |
| 6 | — | 2-hydroxy-1-naphthaldehyde | | 9 | MoO$_2$[naphad]$_2$ | 60.7 | 200-235 |

4-4: Synthesis of MoO$_2$[(5-OMe)salad]$_2$ 7.5 mL of an aqueous solution containing 0.6183 g (0.5002 mmol) of ammonium heptamolybdate ((NH$_4$)$_6$Mo$_7$O$_{24}$/4H$_2$O) was added to 2.5 ml of a methanol solution containing 1.3613 g (8.950 mmol) of 5-methoxylsalicylaldehyde, and 0.5 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 1.2032 g (2.797 mmol) of a yellow crystal (yield: 79.9%).

mp=160-240° C. (degradation), Anal. Calcd for C$_{16}$H$_{14}$O$_8$Mo: C, 44.7; H, 3.3. Found: C, 43.4; H, 3.4.

4-5: Synthesis of MoO$_2$[(5-Me)salad]$_2$ 5 ml of an aqueous solution containing 0.6234 g (0.5044 mmol) of ammonium heptamolybdate ((NH$_4$)$_6$Mo$_7$O$_{24}$/4H$_2$O) was added to 20 ml of a methanol solution containing 1.2337 g (9.061 mmol) of 5-MethylSalicylaldehyde, and 0.5 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 0.8222 g (2.065 mmol) of a yellow crystal (yield: 58.5%).

mp=180-250° C. (degradation), Anal. Calcd for C$_{16}$H$_{14}$O$_6$Mo: C, 48.3; H, 3.54. Found: C, 45.5; H, 3.3.

4-6: Synthesis of MoO$_2$[naphad]$_2$ 7.5 ml of an aqueous solution of 0.192 g (0.5010 mmol) of ammonium heptamolybdate ((NH$_4$)$_6$Mo$_7$O$_{24}$/4H$_2$O) was added to 2.5 ml of a methanol solution containing 1.5537 g (9.024 mmol) of 2-Hydroxy-1-naphthaldehyde, and 0.5 ml of 12M HCl was gradually added to the mixture under stirring. The resulting mixture was reacted as is for 4 hours at room temperature, and the precipitates were collected by filtration. After washing the precipitates with methanol and water, they were dried under reduced pressure, thereby obtaining 0.9991 g (2.1245 mmol) of a yellow crystal (yield: 60.7%).

Example 5

Measurement of Ring-Opening Polymerization Activity of Dioxomolybdenum Salicylaldehyde Complex The dioxomolybdenum salicylaldehyde complexes obtained in Example 4 were reacted in mesitylene at 80° C. using cyclododecanol as an initiator under the following condition: $\epsilon$-caprolactone:initiator:catalyst=100:1:0.05 (molar ratio), thereby examining the ring-opening polymerization activity of $\epsilon$-caprolactone (CL). When $MoO_2[(5\text{-}OMe)salad]_2$ was used, 90% or more of the reaction was advanced after about 15 minutes, thus showing the highest activity. With the other complexes, the reactions were completed substantially after 30 minutes, thus showing a high activity (Table 8).

TABLE 8

CL reaction rate of each catalyst (%)

| | Catalyst | CL reaction rate after 15 minutes (%) | CL reaction rate after 30 minutes (%) |
|---|---|---|---|
| 1 | $MoO_2(salad)_2$ | 20 | 98 |
| 2 | $MoO_2[(3\text{-}OMe)salad]_2$ | 8 | 98 |
| 3 | $MoO_2[(3\text{-}Me)salad]_2$ | 60 | 98 |
| 4 | $MoO_2[(5\text{-}OMe)salad]_2$ | 95 | 100 |
| 5 | $MoO_2[(5\text{-}Me)salad]_2$ | 38 | 99 |
| 6 | $MoO_2[naphad]_2$ | 5 | 48 |

Example 6

Catalyst Activity of Molybdenum Catalyst with Respect to Homopolymerization and Copolymerization A polymerization was performed with lactide (LA) and $\epsilon$-caprolactone (CL) at various proportions, using $MoO_2[(5\text{-}OMe)salad]_2$ as a catalyst. The polymerization was performed at 110° C. under the following condition: [LA+CL]:[initiator]:[catalyst]=100:1:0.05 (molar ratio), using mesitylene as the solvent. The reaction rate and the monomer ratio in the produced polymer were measured by NMR (Table 9). The molecular weight of the produced polymer was measured by GPC.

The above experiment had an unexpected result that the homopolymerization of lactide (LA) was very slow, and the reaction rate was only 14% even after 36 hours (No. 1), showing difficulty in the homopolymerization of lactide with $MoO_2[(5\text{-}OMe)salad]_2$; however, surprisingly, in the synthesis of the copolymer of LA and CL, a copolymer with a mixing ratio substantially equal to the estimation was obtained (No. 2-4). In $^1$H-NMR, in addition to a methylene peak derived from the diads of $\epsilon$-CL-$\epsilon$-CL and LA-LA, a methylene peak of $\epsilon$-CL-LA bond was observed with an integration ratio according to the mixing ratio (FIG. 1(a)-(c)). The melting point (Tm) was not shown in any DSC of No. 2-4, thereby confirming that the copolymerization was not a block copolymerization, but a random copolymerization.

TABLE 9

Copolymerization reaction of LA with $\epsilon$-CL

| No. | Ratio of $\epsilon$-CL/LA | Reaction time (hour) | Reaction rate (%) | Unit ratio of $\epsilon$-CL/LA | Mn (GPC) | Tg |
|---|---|---|---|---|---|---|
| 1 | 0/100 | 36 | 13.9 | —/100 | — | — |
| 2 | 25/75 | 23 | 91.5 | 22/78 | 10400 | +20.4 |
| 3 | 50/50 | 20 | 96.0 | 52/48 | 12800 | −19.5 |
| 4 | 75/25 | 4 | 96.2 | 77/23 | 20000 | −47.2 |

Example 7

Synthesis of $\epsilon$-CL-LA Copolymer Using Various Molybdenum Catalysts

A lactide and $\epsilon$-caprolactone were copolymerized at a molar ratio 50/50 using four kinds of catalysts: $MoO_2[(5\text{-}OMe)salad]_2$, $MoO_2[(3\text{-}OMe)Di\text{-}Me\text{-}saltn]$ (cis-$\alpha$), $MoO_2(acac)_2$, and $(NH_4)_8[Mo_{10}O_{34}]$, and the randomness of the resulting $\epsilon$-CL-LA copolymers was examined.

$MoO_2[(5\text{-}OMe)salad]_2$ was prepared according to the method disclosed in K. Yamanouchi et al., Inorg. Chim. Acta, 1974, 9, 83-86, $MoO_2[(3\text{-}OMe)Di\text{-}Me\text{-}saltn]$ was prepared according to the method of Example 1, and $(NH_4)_8[Mo_{10}O_{34}]$ was prepared according to the method disclosed in J. E. Baez et al., Polymer, 46, 12118-12129, 2005.

The polymerization was performed at 110° C. under the condition: [LA+CL]:[initiator]:[catalyst]=100:1:0.05(molar ratio) using cyclododecanol as an initiator and mesitylene as the solvent. The yield, and the mean sequence lengths $L_{LA}$ and $LC_L$ of the lactide and the caprolactone, were measured by $^{13}$C-NMR, the molecular weight and the molecular weight ratio were measured by GPC, and the glass transition temperature (Tg) was measured using a differential scanning calorimeter (DSC) (Table 10). As a result, for all catalysts, the mean chain lengths $L_{LA}$ and $LC_L$ were both less than 2, and the melting point (Tm) was not shown in DSC, thereby confirming that substantially ideal random copolymers were produced.

TABLE 10

Data regarding synthesis of $\epsilon$-CL-LA copolymer using each catalyst

| Catalyst | Temperature | Yield (%) | $L_{LA}$ | $L_{CL}$ | Mn | PDI | Tg |
|---|---|---|---|---|---|---|---|
| $MoO_2[(5\text{-}OMe)salad]_2$ | 110 | 51.5 | 1.67 | 1.72 | 14400 | 1.48 | −15.7 |
| $MoO_2[(5\text{-}OMe)salad]_2$ | 130 | 41.1 | 1.63 | 1.82 | 17000 | 1.55 | −17.6 |
| $MoO_2[(3\text{-}OMe)Di\text{-}Me\text{-}saltn]$ | 110 | 36.3 | 1.66 | 1.75 | 11900 | 1.43 | −30.0 |

TABLE 10-continued

Data regarding synthesis of ε-CL-LA copolymer using each catalyst

| Catalyst | Temperature | Yield (%) | $L_{LA}$ | $L_{CL}$ | Mn | PDI | Tg |
|---|---|---|---|---|---|---|---|
| $MoO_2(acac)_2$ | 110 | 39.5 | 1.63 | 1.75 | 13070 | 1.44 | −17.0 |
| $(NH_4)_8[Mo_{10}O_{34}]$ | 110 | 16.9 | 1.67 | 1.73 | 9900 | 1.29 | −26.0 |

Further, the progress of the reaction over time was measured by NMR, and the reaction rate, i.e., the consumption amount of LA and CL against time, was measured, with the result that very similar polymerization rate was observed in LA and CL. It was thus confirmed that LA and CL were consumed substantially at the same time (FIG. 2-5).

The invention claimed is:

1. A method for producing a lactide-lactone copolymer, comprising copolymerizing a lactide and a lactone using a molybdenum compound as a catalyst wherein the molybdenum compound is selected from a molybdenum chelate compound, a salt of polyoxomolybdenum, a molybdenum alkoxide, a salt of molybdenum ion and organic acid, and a molybdenum carbonyl compound.

2. The method for producing a lactide-lactone copolymer according to claim 1, wherein the molybdenum compound is a hexavalent molybdenum complex.

3. The method for producing a lactide-lactone copolymer according to claim 2, wherein the hexavalent molybdenum complex is a dioxomolybdenum(VI) complex or a polyoxomolybdenum salt.

4. The method for producing a lactide-lactone copolymer according to claim 3, wherein the dioxomolybdenum(VI) complex is selected from a dioxomolybdenum(VI)acetylacetonato complex, a dioxomolybdenum(VI)salen complex, and a dioxomolybdenum(VI)salicylaldehyde complex.

5. The method for producing a lactide-lactone copolymer according to claim 4, wherein the dioxomolybdenum(VI) salen complex is the oxomolybdenum(VI)salen complex having the chemical formula:

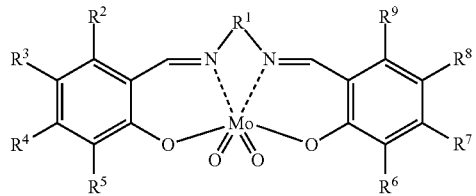

wherein
$R^1$ is a $C_{2-7}$ bivalent aliphatic hydrocarbon group; and
$R^2, R^3, R^4, R^5, R^6, R^7, R^8$, and $R^9$ independently represent hydrogen, a $C_{1-4}$ alkyl group, a $C_{1-4}$ alkoxy group, a silyl group, an aryl group, a methoxy methyl group, —Cl, —Br, or —I.

6. The method for producing a lactide-lactone copolymer according to claim 5, wherein the $R^1$ is —$(CH_2)_2$—, —$(CH_2)_3$—, —$CH_2CH(CH_3)$—, —$CH_2$—$C(CH_3)_2$—$CH_2$—, —$(CH_2)_4$—, 1,2-cyclohexyl group, 1,3-cyclohexyl group, 1,4-cyclohexyl group, 1,2-cyclopentyl group, or 1,2-cycloheptyl group;
$R^2, R^4, R^7$, and $R^9$ are hydrogen or —$CH_3$;
$R^5$ and $R^6$ are hydrogen, —$CH_3$, —$CH_2CH_3$, —$C(CH_3)_3$, —$OCH_3$, —Cl, —Br, or —I; and
$R^3$ and $R^8$ are hydrogen, —$CH_3$, —$CH_2CH_3$, —$C(CH_3)_3$, —$OCH_3$, —Cl, —Br, or —I.

7. The method for producing a lactide-lactone copolymer according to claim 4, wherein the dioxomolybdenum(VI) salicylaldehyde complex is the dioxomolybdenum(VI)salicylaldehyde complex having the chemical formula:

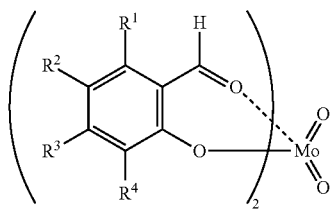

wherein $R^1, R^2, R^3$, and $R^4$ are independently selected from hydrogen, —Cl, —Br, —I, —$NO_2$, —OH, —COOH, $C_{1-6}$ linear or branched alkyl group, aryl group that may have, as a ring-constituent, 2 or less heteroatom independently selected from O, N or S, aryloxy group, alkoxy group, alkane sulfone amide group, and amino group.

8. The method for producing a lactide-lactone copolymer according to claim 7, wherein the $R^1, R^2, R^3$, and $R^4$ are independently selected from hydrogen, —Cl, —Br, —I, —$OCH_3$, —$OCH_2CH_3$, —$NO_2$, —OH, —COOH, —$CH_3$, and —$CH_2CH_3$.

9. The method for producing a lactide-lactone copolymer according to claim 3, wherein the polyoxomolybdenum salt is a salt of an anion selected from the group consisting of $[Mo_3O_{10}]^{2-}$, $[Mo_6O_{20}]^{4-}$, $[Mo_7O_{24}]^{6-}$, $[Mo_8O_{26}]^{4-}$, and $[Mo_{10}O_{34}]^{8-}$, and a cation selected from the group consisting of ammonium ions, alkyl ammonium ions and alkali metal ions.

10. The method for producing a lactide-lactone copolymer according to claim 1, wherein the lactone is ε-caprolactone.

11. The method for producing a lactide-lactone copolymer according to claim 2, wherein the lactone is ε-caprolactone.

* * * * *